United States Patent
Kalmbach et al.

(10) Patent No.: US 11,075,415 B2
(45) Date of Patent: Jul. 27, 2021

(54) ACCUMULATOR ASSEMBLY

(71) Applicant: Mahle International GmbH, Stuttgart (DE)

(72) Inventors: Thomas Kalmbach, Stuttgart (DE); Alireza Mirsadraee, Ludwigsburg (DE); Oleksandr Pavlov, Herrenberg (DE); Mario Wallisch, Aichtal (DE)

(73) Assignee: Mahle International GmbH

( * ) Notice: Subject to any disclaimer, the term of this patent is extended or adjusted under 35 U.S.C. 154(b) by 0 days.

(21) Appl. No.: 16/551,706

(22) Filed: Aug. 26, 2019

(65) Prior Publication Data
US 2020/0136203 A1    Apr. 30, 2020

(30) Foreign Application Priority Data

Aug. 28, 2018  (DE) .................... 10 2018 214 529.6

(51) Int. Cl.
*H01M 10/613* (2014.01)
*H01M 10/625* (2014.01)
*H01M 10/647* (2014.01)
*H01M 10/6555* (2014.01)
*B60L 58/26* (2019.01)

(52) U.S. Cl.
CPC ......... *H01M 10/613* (2015.04); *B60L 58/26* (2019.02); *H01M 10/625* (2015.04); *H01M 10/647* (2015.04); *H01M 10/6555* (2015.04); *H01M 2220/20* (2013.01)

(58) Field of Classification Search
CPC ............ H01M 10/613; H01M 10/625; H01M 10/647; H01M 10/6555
See application file for complete search history.

(56) References Cited

U.S. PATENT DOCUMENTS 5,352,545 A * 10/1994 Furukawa ........... H01M 2/1247
                                                            429/57
5,456,994 A * 10/1995 Mita ................. H01M 10/6555
                                                            429/71
(Continued)

FOREIGN PATENT DOCUMENTS

EP        2319106     *  5/2011
JP     2012-248374 A    12/2012

OTHER PUBLICATIONS

English abstract for JP-2012-248374.

*Primary Examiner* — Olatunji A Godo
(74) *Attorney, Agent, or Firm* — Fishman Stewart PLLC (57) ABSTRACT

An accumulator assembly for a hybrid or electric vehicle may include a plurality of battery cells respectively having mutually opposite bearing faces. The battery cells may be stacked in a stacking direction facing one another with the bearing faces to form a battery block. The assembly may also include a cooling device including a plurality of cooling elements through which a flow of cooling fluid is passable. The plurality of cooling elements may be disposed between neighbouring battery cells and braced in the stacking direction. A respective cooling element of the plurality of cooling elements may at least one of i) include and ii) be formed by a compressible porous intermediate insert having a plurality of pores through which a flow of the cooling fluid is passable. The intermediate insert may be disposed between and connected in a heat-transmitting manner to respective neighbouring battery cells.

19 Claims, 3 Drawing Sheets

(56) References Cited

U.S. PATENT DOCUMENTS

| | | |
|---|---|---|
| 2011/0183187 A1* | 7/2011 | Wenzl ................ H01M 2/0242 429/162 |
| 2013/0071718 A1 | 3/2013 | Cho et al. |
| 2013/0149582 A1 | 6/2013 | Kimura et al. |

* cited by examiner

ACCUMULATOR ASSEMBLY

CROSS-REFERENCE TO RELATED APPLICATIONS

This application claims priority to German Patent Application No. DE 10 2018 214 529.6, filed on Aug. 28, 2018, the contents of which are hereby incorporated by reference in its entirety.

TECHNICAL FIELD

The invention relates to an accumulator assembly for a hybrid or electric vehicle.

BACKGROUND

An accumulator assembly, or a traction battery, respectively, for a hybrid or electric vehicle usually has a plurality of individual battery cells which are combined so as to form a battery module. The individual battery cells in the respective battery module herein are held together by a tensioning device. In the case of pouch cells, the latter by virtue of their unstable shape have to be additionally held together by a suitable mounting or by suitable components, respectively. Furthermore, the individual battery cells in the battery module have to be cooled, wherein an improved heat dissipation between the individual battery cells bearing on one another is in particular pursued.

For example, in the case of pouch cells, auxiliary frames from plastics material can be utilized for establishing in a form-fitting manner and holding the individual battery cells in the respective battery module. For cooling the battery cells herein, ducts which can be passed through by a flow of coolant can be configured in the auxiliary frame. However, the auxiliary frame for establishing and for holding the individual battery cells is often used in the respective battery module, and cooling is performed by cooling structures which are thermally linked to the cell dissipators of the battery cells. Alternatively, U-shaped steel-sheet plates having an auxiliary frame from plastics material can be used for establishing in each case two battery cells on one another, wherein the respective battery cells established on one another are subsequently combined so as to form the respective battery module by way of tensioning brackets. The steel-sheet plates herein are utilized for dissipating heat from the battery cells to a coolant plate that is passed through by a flow of coolant.

In most instances, solutions of this type disadvantageously have an increased requirement in terms of space. Furthermore, the battery cells can often only be cooled from one cell side and, on account thereof, not be sufficiently cooled. Moreover, the equalization of tolerances and the sealing of the battery module can also be problematic.

SUMMARY

It is therefore the object of the invention to specify an improved or at least alternative embodiment for an accumulator assembly of the generic type in which the disadvantages described are at least in part overcome.

Said object is achieved according to the invention by the subject matter of the independent claim(s). Advantageous embodiments are the subject matter of the dependent claim(s).

An accumulator assembly is provided for a hybrid or electric vehicle and has a plurality of battery cells having mutually opposite bearing faces, wherein the battery cells in the stacking direction are stacked so as to face one another by way of the bearing faces and so as to form a battery block. The accumulator assembly furthermore has a cooling device having a plurality of cooling elements which can be passed through by a flow of cooling fluid and which are disposed between the neighbouring battery cells and conjointly with the latter are braced in the stacking direction. According to the invention, the respective cooling element has a compressible porous intermediate insert having a plurality of pores that can be passed through by a flow of the cooling fluid or is formed by said intermediate insert, wherein the intermediate insert is disposed between the respective neighbouring battery cells and is connected in a heat-transmitting manner to said battery cells. The individual pores herein form in particular a duct structure for the cooling fluid.

In the accumulator assembly according to the invention, the heat generated in the battery cells can be dissipated to the outside through the respective cooling element. The respective cooling element herein can be passed through by a flow of the cooling fluid such that the heat transmission to the cooling fluid takes places directly on the bearing faces of the respective neighbouring battery cells. The cooling fluid is preferably a liquid. The cooling fluid herein can flow through the pores of the intermediate insert which is part of the cooling element or forms the cooling element. The intermediate insert is compressible and can moreover compensate the expansion, or an increase in thickness, respectively, of the respective neighbouring battery cells. A contraction, or a decrease in thickness, respectively, of the respective neighbouring battery cells can also be compensated by the intermediate insert. Consequently, on account of the cooling elements, the individual battery cells can be effectively cooled at the beginning as well as at the end of the life cycle independently of the variation in thickness of said battery cells as a result of the charge status or of ageing.

The pores of the intermediate insert herein can be configured in such a manner that said pores remain so as to be able to be passed through by a flow of the cooling fluid even in the event of a compression. In order for a flow of the cooling fluid passing through the intermediate insert to be optimized, the pores of the intermediate insert can at least in regions be aligned in the flow direction of the cooling fluid. The flow resistance and the pressure loss in the intermediate insert can be reduced in this way. The compressible intermediate insert can advantageously be formed from a foam-type material or from a foam-type material composite. The foam-type material is preferably a polyurethane foam, and the foam-type material composite is preferably a polyurethane foam. Alternatively or additionally, the compressible intermediate insert can have at least one integrated spring element.

In the case of one advantageous embodiment of the accumulator assembly it is provided that the intermediate insert bears in a heat-transmitting manner on the bearing faces of the respective neighbouring battery cells. Consequently, the intermediate insert in the case of this embodiment of the accumulator assembly forms the cooling element. The intermediate insert can be passed through by a flow of the cooling fluid such that the heat generated in the battery cells at the bearing faces can be discharged directly to the cooling fluid in the intermediate insert. The paths for the dissipation of heat from the battery cells to the cooling fluid as well as the thermal resistance can advantageously be reduced on account thereof. Furthermore, homogeneous direct cooling of the battery cells across a large area can be achieved in the case of this embodiment. The intermediate insert is moreover compressible such that the expansion, or an increase in thickness, respectively, and a contraction, or a decrease in thickness, respectively, of the respective neighbouring battery cells can be compensated directly by way of the intermediate insert. The intermediate insert, on account thereof, bears in a heat-transmitting manner on the neighbouring battery cells independently of the variation in thickness of said battery cells, and the respective neighbouring battery cells can be effectively cooled at the beginning as well as at the end of the life cycle, independently of the charge status.

Advantageously, it can additionally be provided that the pores of the intermediate insert are closed at least towards the bearing faces of the respective neighbouring battery cells such that the cooling fluid cannot flow directly about the bearing faces of the respective neighbouring battery cells. In this way, the intermediate insert forms a structure which can be passed through by a flow and which is closed towards the outside, and the heat generated in the battery cells at the bearing faces is discharged to the coolant by way of the material of the intermediate insert. Since the intermediate insert forms a structure which is closed towards the outside, the risk of any leakage in the cooling device can advantageously be reduced. Alternatively, the pores of the intermediate insert can be open towards the bearing faces of the respective neighbouring battery cells such that the cooling fluid can flow directly about the bearing faces of the respective neighbouring battery cells. The heat generated in the battery cells herein at the bearing faces is discharged directly to the cooling fluid, and the dissipation of heat from the battery cells can advantageously be intensified. The cooling fluid can advantageously be dielectric in order for the risk of shorting to be reduced.

In the case of one advantageous embodiment of the accumulator assembly it is provided that the respective cooling element has a heat-conducting structure which encloses the intermediate insert towards the outside such that the intermediate insert by way of the heat-conducting structure is connected in a heat-transmitting manner to the bearing faces of the respective neighbouring battery cells. The cooling element in the case of this embodiment is formed by the intermediate insert and the heat-conducting structure. The heat-conducting structure is expediently composed of a heat-conducting material such as, for example, metal and can dissipate the heat generated in the battery cells from the bearing faces of the battery cells to the cooling fluid in the intermediate insert. The heat-conducting structure herein can be fluid-tight towards the outside such that the intermediate insert that can be passed through by a flow of the cooling fluid is sealed towards the outside by the heat-conducting structure.

It can additionally be provided that the heat-conducting structure has two mutually spaced apart compression plates. The compression plates herein bear in a heat-transmitting manner on the bearing faces of the respective neighbouring battery cells, and the intermediate insert is disposed in a heat-transmitting manner between the compression plates and so as to bear on the latter. An expansion of the respective neighbouring battery cells in the stacking direction in this instance can be absorbed at least by the elastic deformation of the compression plates and the deformation of the intermediate insert. The compression plates herein remain so as to bear in a planar and heat-transmitting manner on the bearing faces. The intermediate insert is compressed and continues to remain disposed between the compression plates so as to bear on the latter. The compression plates herein are elastically deformed such that the compression plates in the event of a contraction, or a decrease in thickness, respectively, of the respective neighbouring battery cells follow the respective bearing faces and remain so as to bear in a planar and heat-transmitting manner on said bearing faces. The intermediate insert herein is decompressed and continues to remain disposed between the compression plates so as to bear on the latter. Homogeneous cooling of the bearing faces across a large area can be achieved on account thereof, and the individual battery cells can be effectively cooled at the beginning as well as at the end of the life cycle independently of the variation in thickness of said battery cells as a result of the charge status.

It can advantageously be provided that the heat-conducting structure is a metallic profile. The metallic profile herein is preferably produced from aluminum and preferably by an extrusion press method or by an extrusion method, or is produced as a steel-sheet bent part. The metallic profile, in particular produced from aluminum, enables an effective dissipation of heat from the respective neighbouring battery cells to the cooling fluid that flows through the intermediate insert. Moreover, the metallic profile can be produced in a time-saving and cost-saving manner by the extrusion press method or by the extrusion method such that the production costs and the production complexity can be reduced overall.

In the case of one refinement of the heat-conducting structure it can be provided that the heat-conducting structure at least on one side has a cell-holding collar which in the stacking direction projects from the respective compression plates at least on one side. In this instance, at least one of the respective neighbouring battery cells can at least in portions bear on the cell-holding collar and, on account thereof, can be established transversely to the stacking direction in the battery block. The cell-holding collar in the stacking direction can advantageously project from both sides and, on account thereof, can establish the two neighbouring battery cells transversely to the stacking direction. In this advantageous way the battery cells, and in particular pouch cells, in the battery block can be established transversely to the stacking direction by the respective cooling element such that a conventionally required mounting for the battery cells can be dispensed with and the overall construction of the accumulator assembly is simplified. The cell-holding collar in relation to the compression plates of the heat-conducting structure can at least in regions advantageously have an angle that deviates from 90° in order to reduce the risk of damage to the battery cells, and in particular to the pouch cells, when assembling. Alternatively or additionally, the heat-conducting structure at least on one side can have a peripheral support collar which in the stacking direction projects from both sides of the compression plates. The battery block can be supported in a housing by way of the support collar, for example.

It can advantageously be provided that the cell-holding collar and/or the support collar by way of a spring unit that is resilient transversely to the stacking direction are/is connected to the respective compression plates. A variation in the length of the cooling element transversely to the stacking direction herein can be compensated as a result of a deformation of the compression plates in the stacking direction. In particular, the battery cells herein are only insignificantly influenced by the cell-holding collar and, on account thereof, are additionally treated with care, independently of the variation in thickness of said battery cells in the stacking direction. The resilient spring unit can be formed, for example, by a corrugated connection region which adjoins the cell-holding collar and/or the support collar and/or at least one of the compression plates in an integral manner.

In the case of one advantageous refinement of the cooling device it is provided that the cooling device has a fluid distributor and/or a fluid collector which can be passed through by a flow of the cooling fluid and are/is disposed on one side of the battery block. The respective cooling element in this instance is fluidically connected to the fluid distributor and/or to the fluid collector of the cooling device. On account thereof, the heat generated in the battery cells can be discharged to the cooling fluid in the intermediate insert, and the cooling fluid by way of the fluid distributor and/or the fluid collector can be connected to a chiller, for example. In this advantageous way, the dissipation of heat in the battery cells can be intensified and the battery cells, on account thereof, can be cooled in an optimal manner.

In summary, the battery cells in the accumulator assembly according to the invention can be effectively cooled on both sides at the beginning as well as at the end of the life cycle independently of the variation in thickness of said battery cells by virtue of the charge status. Furthermore, homogeneous cooling of the bearing faces of the battery cells across a large area can be achieved by way of the cooling element according to the invention. Moreover, the paths for the dissipation of heat as well as the thermal resistance in the accumulator assembly can advantageously be reduced. Furthermore, the cooling element of the accumulator assembly according to the invention unifies thermal as well as mechanical functions and said cooling element can be produced in a simplified manner. Additionally, the individual battery cells can also be established transversely to the stacking direction on account of the cooling element such that additional, conventionally required mountings are dispensed with. On account thereof, the overall construction of the battery block can advantageously be simplified.

Further important features and advantages of the invention are derived from the dependent claims, from the drawings, and from the associated description of the figures with the aid of the drawings.

It is understood that the features mentioned above and the features yet to be discussed below may be used not only in the respectively specified combination but also in other combinations or individually without departing from the scope of the present invention.

Preferred exemplary embodiments of the invention are illustrated in the drawings and will be explained in more detail in the description hereunder, wherein the same reference signs refer to identical or similar or functionally equivalent components.

DETAILED DESCRIPTION

Figure 1:
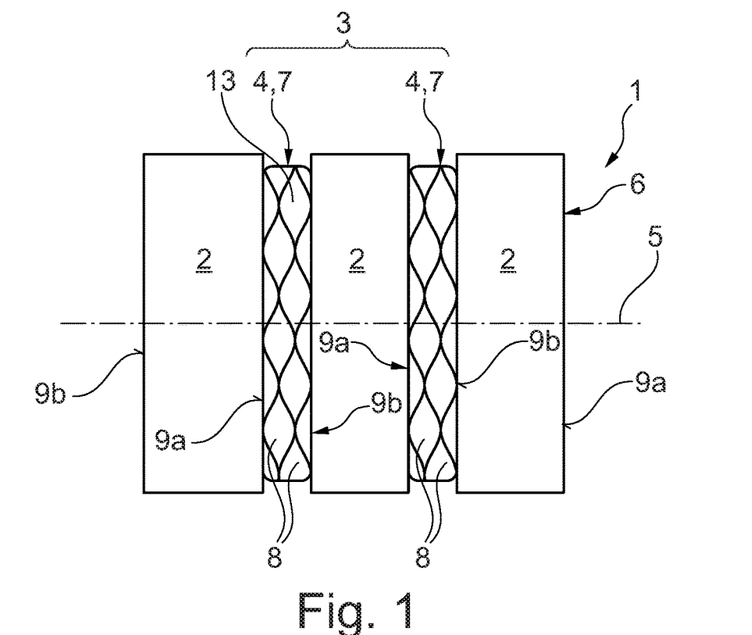
FIG. 1 shows a sectional illustration of an accumulator assembly according to the invention in a first embodiment.

FIG. 1 shows a sectional view of an accumulator assembly 1 according to the invention for a hybrid or electric vehicle, in a first embodiment. The accumulator assembly 1 herein has a plurality of battery cells 2 and a cooling device 3 having a plurality of cooling elements 4. Only part of the accumulator assembly 1 is shown in FIG. 1. It goes without saying that the accumulator assembly 1 can also have further battery cells 2 and further cooling elements 4, as well as other construction elements such as, for example, a fluid distributor that can be passed through by a flow of the cooling fluid, or a fluid collector that can be passed through by a flow of the cooling fluid, or a tensioning device. The respective cooling elements 4 herein are disposed between the battery cells 2 and conjointly with the latter braced in the stacking direction 5 so as to form a battery block 6. The cooling element 4 in the first embodiment of the accumulator assembly 1 is formed by a compressible porous intermediate insert 7 which has a plurality of pores 8 that can be passed through by a flow of the cooling fluid. The intermediate insert 7 herein is formed from a foam-type material, preferably a polyurethane foam, and has a honeycomb-type structure which forms the pores 8 of the intermediate insert 7, said pores 8 being able to be passed through by a flow of the cooling fluid.

The pores 8 of the intermediate insert 7 herein can be closed towards the outside in relation to the respective neighbouring battery cells 2 such that the intermediate insert 7 is fluid-tight in relation to the bearing faces 9a and 9b of the respective neighbouring battery cells 2. Alternatively, the pores 8 of the intermediate insert 7 can be opened towards the outside in relation to the respective neighbouring battery cells 2. The cooling fluid in this instance can expediently be dielectric. Moreover, the individual pores 8 of the intermediate insert 7 in the flow direction 13 of the cooling fluid are aligned transversely to the stacking direction 5 and enable the cooling fluid to flow through the intermediate insert 7 at a reduced flow resistance and a reduced pressure loss. The intermediate insert 7 bears in a heat-transmitting manner directly on the bearing faces 9a and 9b of the respective neighbouring battery cells 2 such that the heat generated in the battery cells 2 at the bearing faces 9a and 9b can be discharged to the cooling fluid in a homogeneous manner across a large area by way of the material of the intermediate insert 7.

The intermediate insert 7 on account of the honeycomb-type structure is compressible in the stacking direction 5 such that the expansion, or an increase in thickness, respectively, and a contraction, or a decrease in thickness, respectively, of the respective neighbouring battery cells 2 in the stacking direction 5 are compensated by way of the intermediate insert 7. The intermediate insert 7, on account thereof, bears in a heat-transmitting manner on the respective neighbouring battery cells 2 independently of the variation in thickness of said battery cells 2, and the respective neighbouring battery cells 2 can be effectively cooled at the beginning as well as at the end of the life cycle, independently of the charge status.

Figure 2:
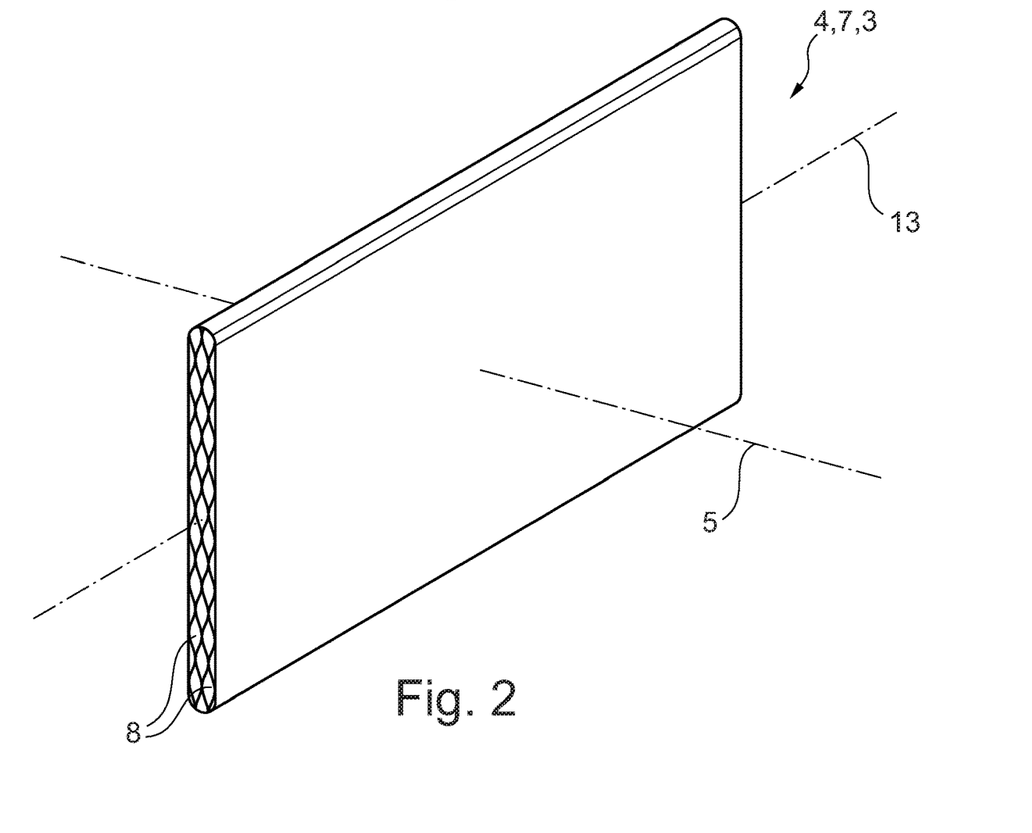
FIG. 2 shows a view of a cooling element in the accumulator assembly in the first embodiment.
Figure 3:
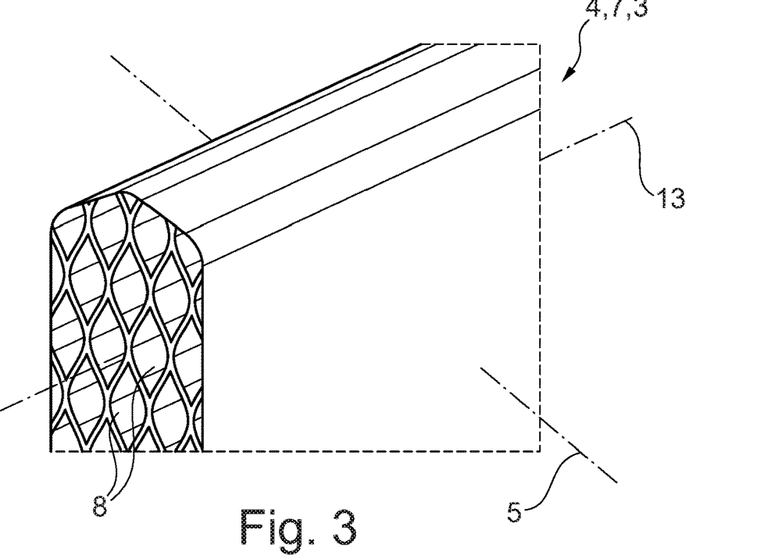
FIG. 3 shows a partial view of the cooling element from FIG. 2 in the accumulator assembly in the first embodiment.

FIG. 2 shows a view of the cooling element 4 in the accumulator assembly 1 in the first embodiment. An enlarged partial view of the cooling element 4 from FIG. 2 is shown in FIG. 3. As has already been explained above, the cooling element 4 is formed by the intermediate insert 7 which has the plurality of pores 8. The intermediate insert 7 can be passed through by a flow of the cooling fluid, wherein the pores 8 are closed towards the bearing faces 9a and 9b of the respective neighbouring battery cells 2. The risk of any leakage in the battery block 6 can in particular be reduced on account thereof.

Figure 4:
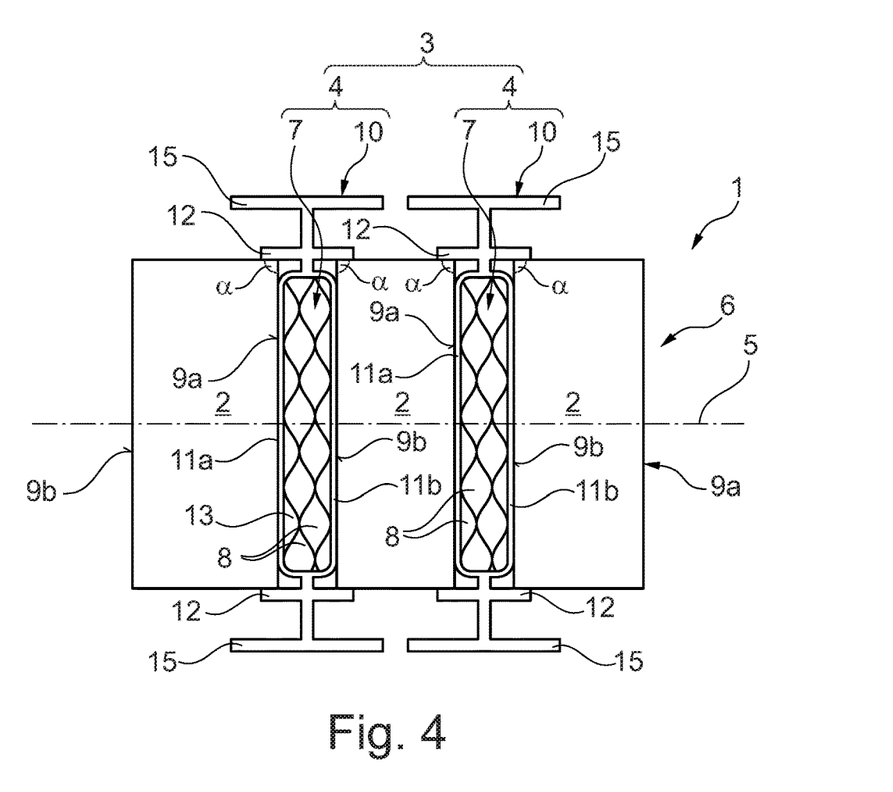
FIG. 4 shows a sectional view of an accumulator assembly according to the invention in a second embodiment.

FIG. 4 shows a sectional view of the accumulator assembly 1 according to the invention for a hybrid or electric vehicle, in a second embodiment. The accumulator assembly 1 here has the cooling element 4 of the cooling device 3, said cooling element 4 being designed so as to deviate from the first embodiment. The accumulator assembly 1 in the second embodiment otherwise corresponds to the accumulator assembly 1 in the first embodiment as per FIG. 1 to FIG. 3. Only part of the accumulator assembly 1 is shown in FIG. 4. It goes without saying that the accumulator assembly 1 can also have further battery cells 2 and further cooling elements 4, as well as other construction elements such as, for example, a fluid distributor that can be passed through by a flow of cooling fluid, or a fluid collector that can be passed through by a flow of cooling fluid, or a tensioning device. The cooling element 4 here has a heat-conducting structure 10 which encases the intermediate insert 7 in such a manner that the intermediate insert 7 by way of the heat-conducting structure 10 is connected in a heat-transmitting manner to the bearing faces 9a and 9b of the respective neighbouring battery cells 2. The cooling element 4 in the case of the second embodiment of the accumulator assembly 1 is formed by the intermediate insert 7 and the heat-conducting structure 10.

The heat-conducting structure 10 herein has two mutually spaced apart compression plates 11a and 11b which bear in a heat-transmitting manner on the bearing faces 9a and 9b of the respective neighbouring battery cells 2. The intermediate insert 7 is disposed between the compression plates 11a and 11b and bears in a heat-transmitting manner on the latter. An expansion of the respective neighbouring battery cells 2 in the stacking direction 5 in the case of the second embodiment of the accumulator assembly 1 can be absorbed by the elastic deformation of the compression plates 11a and 11b and the deformation of the intermediate insert 7. The compression plates 11a and 11b herein remain so as to bear in a planar and heat-transmitting manner on the bearing faces 9a and 9b. The intermediate insert 7 in this instance is compressed and continues to remain disposed between the compression plates 11a and 11b so as to bear on the latter. The pores 8 of the intermediate insert 7 herein are configured in such a manner that said pores 8 remain so as to be able to be passed through by a flow of the cooling fluid even in the event of a compression of the intermediate insert 7. The compression plates 11a and 11b are elastically deformed such that the compression plates 11a and 11b in the event of a contraction, or a decrease in thickness, respectively, of the respective neighbouring battery cells 2 follow the respective bearing faces 9a and 9b and remain so as to bear in a planar and heat-transmitting manner on said bearing faces 9a and 9b. The intermediate insert 7 in this instance is decompressed and continues to remain disposed between the compression plates 11a and 11b so as to bear on the latter. Homogeneous cooling of the bearing faces 9a and 9b across a large area can be achieved on account of the cooling fluid, and the individual battery cells 2 can be effectively cooled at the beginning as well as at the end of the life cycle independently of the variation in thickness of said battery cells 2 as a result of the charge status or of ageing.

The heat-conducting structure 10 moreover on both sides has a cell-holding collar 12 that projects on both sides in the stacking direction 5. The cell-holding collar 12 herein projects from the compression plates 11a and 11b and establishes the respective neighbouring battery cells 2 transversely to the stacking direction 5. On account thereof, the battery cells 2, and in particular the pouch cells, can be held in the battery block 6, and a conventionally required mounting for the battery cells 2 is dispensed with. The overall construction of the accumulator assembly 1 can in particular be simplified on account thereof. The cell-holding collar 12 in this exemplary embodiment in relation to the compression plates 11a and 11b has an angle α equal to 90°. However, the angle α can also deviate from 90° in order to reduce a risk of damage to the battery cells 2, and in particular to the pouch cells, when assembling. The heat-conducting structure 10 furthermore on both sides has a support collar 15 that projects on both sides in the stacking direction 5. The battery block 6 can be supported in a housing by way of the support collar 15, for example.

Figure 5:
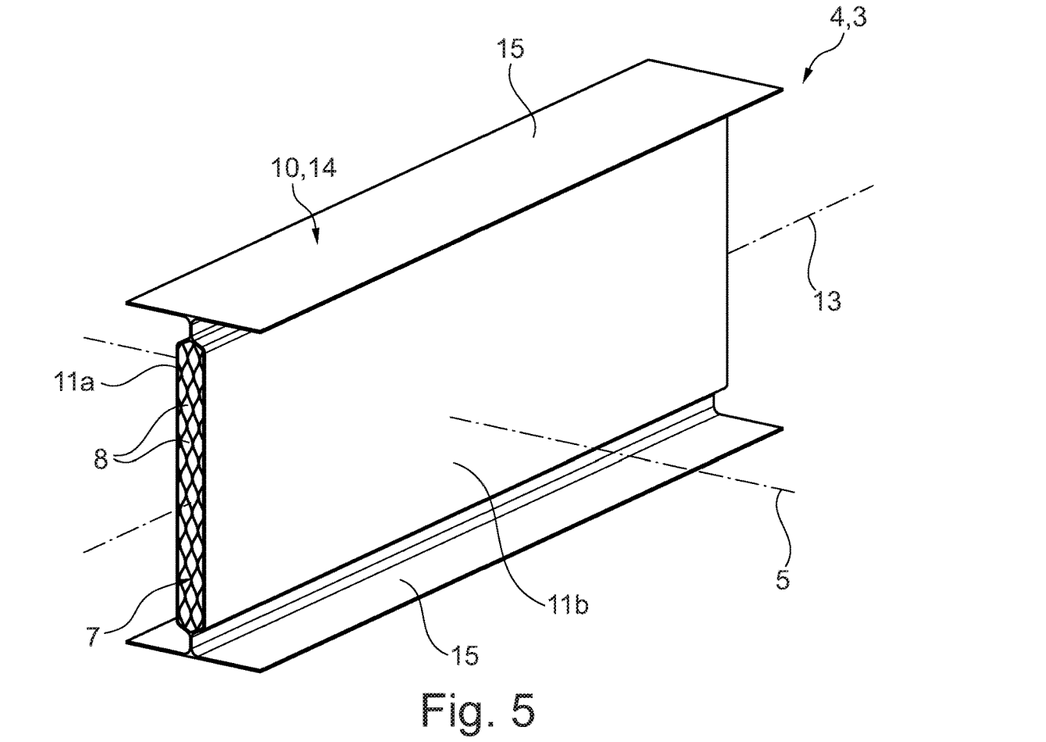
FIG. 5 shows a view of cooling element of an alternative design embodiment in the accumulator assembly in the second embodiment.
Figure 6:
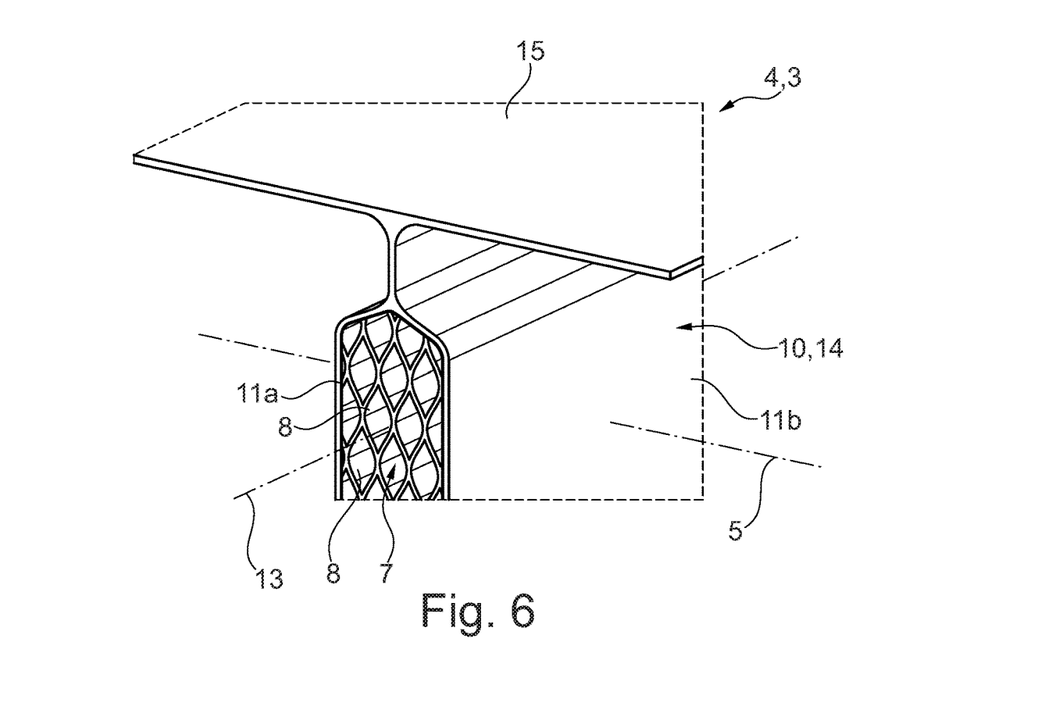
FIG. 6 shows a partial view of the cooling element from FIG. 5 in the accumulator assembly in the second embodiment.

FIG. 5 shows a view, and FIG. 6 shows an enlarged partial view, of the cooling element 4 of the alternative design embodiment in the accumulator assembly 1 in the second embodiment. The heat-conducting structure 10 here is a metallic profile 14. The profile 14 is preferably produced from aluminum and preferably by an extrusion press method or by another extrusion method, or is produced as a steel-sheet bent part. The metallic profile 14 improves the dissipation of heat from the respective neighbouring battery cells 2 by way of the intermediate insert 7 into the cooling fluid and there beyond towards the outside. Deviating from the heat-conducting structure 10 in FIG. 4, the heat-conducting structure 10 here does not have a cell-holding collar 12. The heat-conducting structure here otherwise corresponds to the heat-conducting structure 10 shown in FIG. 4.

In summary, the battery cells 2 in the accumulator assembly 1 according to the invention can be effectively cooled on both sides at the beginning as well as at the end of the life cycle independently of the variation in thickness of said battery cells by virtue of the charge status. Furthermore, homogeneous cooling of the bearing faces 9a and 9b across a large area can be achieved by way of the cooling element 3 according to the invention. Moreover, the paths for the dissipation of heat as well as the thermal resistance in the accumulator assembly 1 can advantageously be reduced. Furthermore, the cooling element 3 of the accumulator assembly 1 unifies thermal as well as mechanical functions and said cooling element 3 is embodied in a simplified manner. Additionally, the individual battery cells 2 can also be established transversely to the stacking direction 5 by the cooling element 4, on account of which additional, conventionally required mountings are dispensed with, and the overall construction of the battery block 6 is advantageously simplified.

The invention claimed is:

1. An accumulator assembly for a hybrid or electric vehicle, comprising: a plurality of battery cells respectively having mutually opposite bearing faces; the battery cells stacked in a stacking direction facing one another with the bearing faces to form a battery block; a cooling device including a plurality of cooling elements through which a flow of cooling fluid is passable, the plurality of cooling elements disposed between neighbouring battery cells of the plurality of battery cells and, conjointly with the neighbouring battery cells, braced in the stacking direction; a compressible porous intermediate insert having a plurality of pores through which a flow of the cooling fluid is passable; wherein a respective cooling element of the plurality of cooling elements at least one of i) includes the intermediate insert and ii) is formed by the intermediate insert; wherein the intermediate insert is disposed between and is connected in a heat-transmitting manner to respective neighbouring battery cells of the plurality of battery cells; wherein the cooling device includes at least one of a fluid distributor and a fluid collector through which a flow of cooling fluid is passable, the at least one of the fluid distributor and the fluid collector disposed on one side of the battery block; wherein the respective cooling element is fluidically connected to the at least one of the fluid distributor and the fluid collector of the cooling device; and wherein the intermediate insert is composed of at least one of a polyurethane foam and a foam-type material composite.

2. The accumulator assembly according to claim 1, wherein the intermediate insert bears in a heat-transmitting manner on the bearing faces of the respective neighbouring battery cells.

3. The accumulator assembly according to claim 2, wherein one of:
the plurality of pores of the intermediate insert are closed at least towards the bearing faces of the respective neighbouring battery cells such that the cooling fluid cannot flow directly about the bearing faces of the respective neighbouring battery cells; and
the plurality of pores of the intermediate insert are open towards the bearing faces of the respective neighbouring battery cells such that the cooling fluid is flowable directly about the bearing faces of the respective neighbouring battery cells.

4. The accumulator assembly according to claim 1, wherein the plurality of pores of the intermediate insert, at least in regions, are aligned in a flow direction of the cooling fluid.

5. The accumulator assembly according to claim 1, wherein the respective cooling element includes a heat-conducting structure enclosing the intermediate insert towards an outside such that the intermediate insert, by way of the heat-conducting structure, is connected in a heat-transmitting manner to the bearing faces of the respective neighbouring battery cells.

6. The accumulator assembly according to claim 5, wherein the heat-conducting structure includes two mutually spaced apart compression plates bearing in a heat-transmitting manner on the bearing faces of the respective neighbouring battery cells, and wherein the intermediate insert is disposed in a heat-transmitting manner between the two compression plates and bears on the two compression plates such that an expansion of the respective neighbouring battery cells in the stacking direction is absorbable at least by an elastic deformation of the two compression plates and a deformation of the intermediate insert.

7. The accumulator assembly according to claim 5, wherein the heat-conducting structure is a metallic profile.

8. The accumulator assembly according to claim 6, wherein:
the heat-conducting structure, at least on one side, has a cell-holding collar which, in the stacking direction, projects from the two compression plates at least on one side; and
at least one of the respective neighbouring battery cells, at least in portions, bears on the cell-holding collar and is secured transversely to the stacking direction in the battery block.

9. The accumulator assembly according to claim 8, wherein an angle between the cell-holding collar and the two compression plates deviates from 90°.

10. The accumulator assembly according to claim 8, wherein:
at least one of i) the cell-holding collar and ii) a support collar, is connected to at least one of the two compression plates such that a variation in a length of the respective cooling element transversely to the stacking direction is compensable via a deformation of the at least one of the two compression plates in the stacking direction; and
the support collar projects from at least one side of the heat-conducting structure, is disposed peripherally on the heat-conducting structure, and projects in the stacking direction from both sides of the two compression plates via a spring unit that is resilient transversely to the stacking direction.

11. The accumulator assembly according to claim 10, wherein the resilient spring unit is structured as a corrugated connection region adjoining at least one of the cell-holding collar, the support collar and at least one of the two compression plates, in an integral manner.

12. The accumulator assembly according to claim 1, wherein the intermediate insert includes at least one integrated spring element.

13. The accumulator assembly according to claim 2, wherein the plurality of pores of the intermediate insert are closed at least towards the bearing faces of the respective neighbouring battery cells such that the cooling fluid cannot flow directly about the bearing faces of the respective neighbouring battery cells.

14. The accumulator assembly according to claim 2, wherein the plurality of pores of the intermediate insert are open towards the bearing faces of the respective neighbouring battery cells such that the cooling fluid is flowable directly about the bearing faces of the respective neighbouring battery cells.

15. An accumulator assembly for a hybrid or electric vehicle, comprising: a plurality of battery cells stacked along a stacking direction defining a battery block, each of the plurality of battery cells having a plurality of bearing faces disposed opposite one another and facing in the stacking direction; a cooling device including a plurality of cooling elements through which a flow of cooling fluid is passable, the plurality of cooling elements disposed between neighbouring battery cells of the plurality of battery cells and braced in the stacking direction conjointly with the neighbouring battery cells; a compressible porous intermediate insert having a plurality of pores through which a flow of the cooling fluid is passable, the intermediate insert disposed between and connected in a heat transmitting manner to respective neighbouring battery cells of the plurality of battery cells; wherein a respective cooling element of the plurality of cooling elements at least one of i) includes the intermediate insert and ii) is defined by the intermediate insert; wherein, at least in regions, the plurality of pores extend through the intermediate insert in alignment with a flow direction of the cooling fluid and transversely to the stacking direction; wherein the respective cooling element includes a heat-conducting structure enclosing the intermediate insert towards an outside such that the intermediate insert, by way of the heat conducting structure, is connected in a heat-transmitting manner to the bearing faces of the respective neighbouring battery cells; and wherein the intermediate insert is composed of at least one of a polyurethane foam and a foam-type material composite.

16. An accumulator assembly for a hybrid or electric vehicle, comprising: a plurality of battery cells stacked along a stacking direction defining a battery block, each of the plurality of battery cells having a plurality of bearing faces disposed opposite one another and facing in the stacking direction; a cooling device including a plurality of cooling elements through which a flow of cooling fluid is passable, the plurality of cooling elements disposed between neighbouring battery cells of the plurality of battery cells and braced in the stacking direction conjointly with the neighbouring battery cells; a compressible porous intermediate insert having a honeycomb-type structure defining a plurality of pores through which a flow of the cooling fluid is passable, the intermediate insert disposed between and connected in a heat-transmitting manner to respective neighbouring battery cells of the plurality of battery cells; wherein a respective cooling element of the plurality of cooling elements at least one of i) includes the intermediate insert and ii) is defined by the intermediate insert; and wherein the intermediate insert is composed of at least one of a polyurethane foam and a foam-type material composite.

17. The accumulator assembly according to claim 16, wherein:
the cooling device includes at least one of a fluid distributor and a fluid collector through which a flow of cooling fluid is passable, the at least one of the fluid distributor and the fluid collector disposed on one side of the battery block; and
the respective cooling element is fluidically connected to the at least one of the fluid distributor and the fluid collector of the cooling device.

18. The accumulator assembly according to claim 16, wherein:
the intermediate insert bears in a heat-transmitting manner on the bearing faces of the respective neighbouring battery cells; and
the plurality of pores of the intermediate insert are one of open and closed at least towards the bearing faces of the respective neighbouring battery cells.

19. The accumulator assembly according to claim 1, wherein the intermediate insert has a honeycomb-type structure that defines the plurality of pores.

\* \* \* \* \*